2,544,740

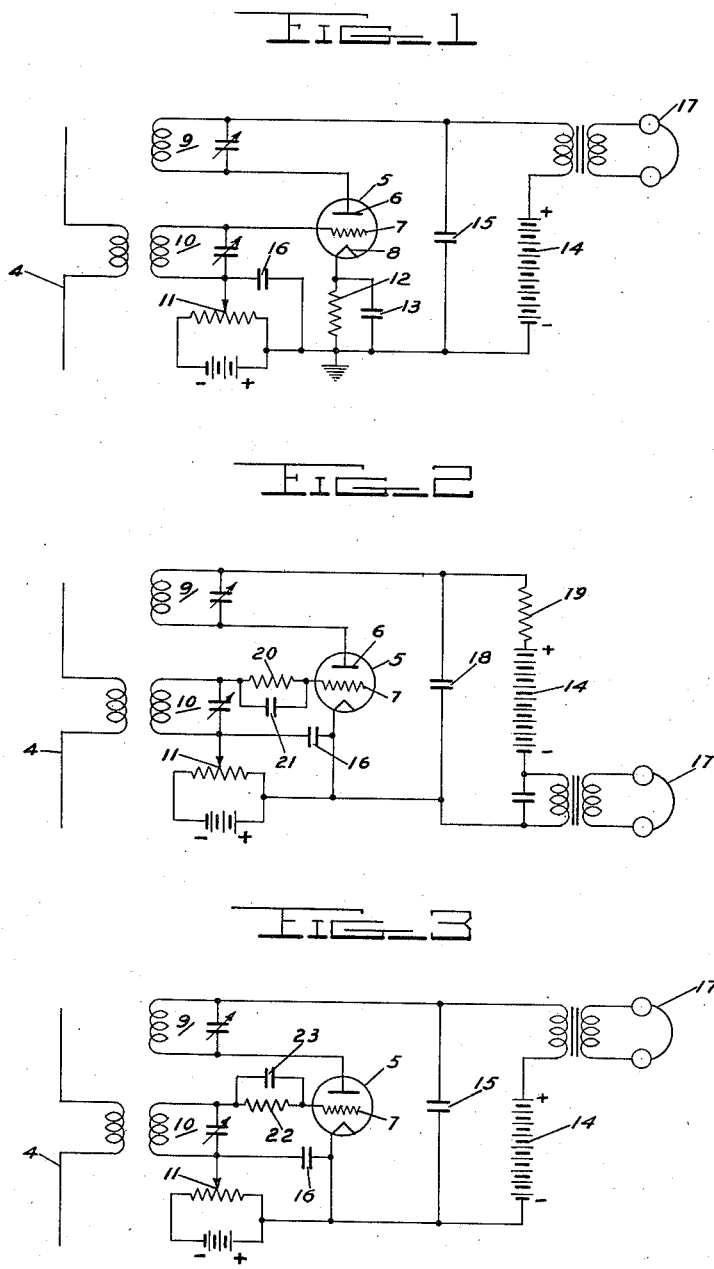
March 13, 1951     A. A. VARELA     2,544,740
RADIO PULSE COMMUNICATION SYSTEM
Filed Oct. 27, 1938
INVENTOR
Arthur A. Varela
BY
Ransom K. Davis
ATTORNEY Patented Mar. 13, 1951

UNITED STATES PATENT OFFICE 2,544,740

RADIO PULSE COMMUNICATION SYSTEM

Arthur A. Varela, Washington, D. C.

Application October 27, 1938, Serial No. 237,221

17 Claims. (Cl. 250—8)

(Granted under the act of March 3, 1883, as amended April 30, 1928; 370 O. G. 757)

This invention relates to means for producing an audible or control signal of considerable power from a transmitted signal of low power in the form of very short pulses emitted at audio frequency.

Among the several objects of this invention are:

To provide means whereby pulses of high frequency energy may be utilized to produce a strong signal at a distance from the source, permitting the use of transmitting equipment of low power and simple construction;

To provide means for extending the upper frequency limit of communication with superfrequency negative grid transmitters by utilizing momentary anode voltages of very high value with a consequent reduction of electron transit time within the tubes;

To provide means whereby a received signal of very short duration may be used to produce a response of considerably longer duration.

In the drawings:

Fig. 1 depicts a form of my invention wherein energy is stored by oscillations initiated by a short signal and the stored energy is utilized to quench or extinguish the oscillations after a predetermined time;

Fig. 2 shows another embodiment of my invention wherein energy is stored between periods of oscillation and is utilized to maintain the oscillatory condition for desired interval;

Fig. 3 illustrates a form of my invention similar to Fig. 1 except that the potential built up by energy passed through the tube is applied differently.

The present invention is intended to be used for the reception of pulses made up of very high frequency waves, the duration of each pulse being short, on the order of a microsecond, and the frequency of the pulses being at an audio rate, say 100 per second. While this invention is particularly adapted for reception of transmitted energy of the kind mentioned, its usefulness is not limited to that field, as other frequencies, both of the waves that make up each pulse and of the pulses in the train of pulses may be varied. One advantage of very short pulses is that a small average power input can produce pulses of extremely large power value. A pulse transmitter adapted for use with the present invention is disclosed in the application of R. M. Page, Serial Number 223,502, filed August 6, 1938.

For example, if the transmitter sends pulses of 10 microseconds duration at the rate of 200 pulses per second the ratio between instantaneous power of the pulses and the average power of the transmitter is 500. An instantaneous power of 500 watts may therefore be obtained with a 1 watt transmitter provided the transmitter tube will stand the instantaneous voltages and currents. It has been found that tubes are not damaged by outputs many hundreds of times their normal rated output when that output is in the form of very short pulses with an interval between pulses that is long in comparison with the duration of a single pulse.

The power output of an ordinary receiver is governed by the time integral of received energy over the audio frequency cycle, and the effective audio output power produced by recurrent short pulses from a transmitter like that above mentioned is somewhat less than would be produced by a 100% sine wave modulation of a continually operating transmitter of the same average power output, although the instantaneous voltages produced by the short pulses may be many times greater.

In the present system of communication the high momentary voltage produced in the receiver by the pulse radiated from the transmitter is utilized to initiate oscillation in a self-quenching pulse oscillator in the receiver, having a pulse duration time much longer than the pulse duration time of the transmitter. That is, the received pulse starts a local oscillator which continues to oscillate for some time after the received pulse has ceased, and which stops oscillating through a self-quenching action of its own circuit. The oscillators employed are responsive to the input pulse signal to change from a first condition of operation to a second condition of operation, which latter persists for a period of time independent of the characteristics of the applied impulse signal. Such circuits are generally referred to as trigger circuits.

For normal communication, using the present invention, the pulses are transmitted at an audible rate such as 200 per second, and the receiver oscillation time is preferably approximately half the time between two succeeding pulses. The transmitter is keyed in the usual manner for code communication.

In Fig. 1 the input means for feeding into the system is shown as a dipole 4, but it is to be understood that it may, when desired, be the output of an amplifying stage. The vacuum tube 5 has its anode 6, grid 7 and cathode 8 associated with the tuned plate circuit 9 and tuned grid circuit 10 that are tightly coupled, the input 4 feeding into the circuit 10. Voltage divider 11 is provided to bias grid 7 to prevent oscillation in the absence of signal in the input 4. Connected in series with cathode 8 are the resistor 12 and capacitor 13 in parallel with each other. The plate supply 14 is bypassed by a capacitor 15, and the grid bias means is bypassed by capacitor 16. The output device is represented, for purpose of explanation, by the phones 17.

With the voltage divider 11 properly adjusted, the system will not oscillate until a signal is received from the input means 4. This signal will initiate oscillation which will continue until the potential of capacitor 13 across resistor 12 is built up to a value such that the bias on cathode 8, due to this potential, extinguishes the oscillations. Capacitor 13 will then discharge through resistor 12 and the system is in condition to receive another pulse. It is obvious that the duration of the time of oscillation is governed by the time constant of the resistor 12 and capacitor 13. It will be understood that the system should be so biased that it is on the verge of oscillation when no signal is present.

Thus, a series of radio frequency pulses, each pulse being very short, will produce in the receiver a corresponding series of pulses each of relatively long duration. If the frequency of the pulses in the series is an audio frequency the output of the receiver oscillator will vary so as to produce a strong audio signal in the phones 17.

Fig. 2 is in general similar to Fig. 1, and the corresponding parts have been designated by the same reference characters. However, in this form of my invention the capacitor 18 is charged by battery 14 through the resistor 19, resistor 19 having such value that the battery 14 cannot supply sufficient energy to anode 6 of tube 5 to maintain oscillations, and consequently the oscillations must be maintained by the energy stored in capacitor 18. When a pulse is received the system begins to oscillate and the oscillations are maintained by capacitor 18 until the potential of said capacitor drops to such value that the bias on grid 7 extinguishes the oscillations. After tube 5 ceases to pass current, the capacitor 18 is again charged through resistor 19 and is in condition to support the oscillation for a period determined by the value of capacitor 18, which period is preferably long in comparison to the duration of a single pulse. The self-biasing resistor 20 and capacitance 21 are in the grid circuit, as well known in this art.

The modification illustrated in Fig. 3 differs from Fig. 1 in that the resistor 22 and capacitor 23 in the grid circuit determine the duration of the oscillations. The grid current gradually builds up on capacitance 23 a potential that swings grid 7 so far negative that the oscillations are quenched, and when the grid current ceases capacitor 23 discharges through resistor 22.

If desired, any usual type of preamplifier or superheterodyne converter may be used ahead of the system shown in the figures of the drawing instead of the input means 4 there illustrated.

The invention herein described and claimed may be used and/or manufactured by or for the Government of the United States of America for governmental purposes without the payment of any royalties thereon or therefor.

I claim:

1. Apparatus for radio reception, comprising input means; an oscillatory network including a vacuum tube having a grid, a plate and a cathode, a resonant grid circuit coupled to said input means and a resonant plate circuit tightly coupled to grid circuit; an adjustable grid bias source connected to said grid to prevent oscillation in the absence of signal in said input means, a resistor and a capacitor connected in parallel between said cathode and said biasing means, and an output circuit between said plate and the low potential side of said resistor and capacitor, the values of said resistor and capacitor being such that in a predetermined time said capacitor will be charged by the plate-cathode current during oscillation to a potential that extinguishes oscillation.

2. Apparatus for radio reception, comprising input means; an oscillatory network including a vacuum tube having a grid, a plate and a cathode, a resonant grid circuit coupled to said input means and a resonant plate circuit coupled to grid circuit; a grid bias source connected to said grid to prevent oscillation in the absence of signal in said input means, a resistor and a capacitor connected in parallel between said cathode and said biasing means, and an output circuit between said plate and the low potential side of said resistor and capacitor, the values of said resistor and capacitor being such that in a predetermined time said capacitor will be charged by the plate-cathode current during oscillation to a potential that extinguishes oscillation.

3. Apparatus for radio reception, comprising input means, an oscillatory network including a vacuum tube having a grid, a plate and a cathode, a resonant grid circuit coupled to said input means and a resonant plate circuit coupled to grid circuit; a grid bias source connected to said grid to prevent oscillation in the absence of signal in said input means, and means, connected between said plate and said cathode, wherein the plate-cathode current builds up, in a predetermined time, a potential that extinguishes oscillation.

4. Apparatus for radio reception, comprising input means; an oscillatory network including a vacuum tube having a cathode, a grid and a plate, a resonant grid circuit coupled to said input means, and grid circuit including also a resistor and a capacitor in parallel connected to said grid; an adjustable grid bias source connected to said grid to prevent oscillation in the absence of signal in said input means, plate supply means and a resistor in series therewith between said supply means and said plate, the other side of said supply means being connected to said cathode, and a capacitance connected to a point between said resistor and said plate and to said cathode, the value of said capacitance being such that energy stored therein will maintain oscillations for a predetermined time and the value of said resistor in the plate supply circuit being such that the plate can not by itself, maintain oscillations.

5. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent oscillation in the absence of signal in said input means, plate supply means and a resistor in series therewith between said supply means and said plate, the other side of said supply means being connected to said cathode, and a capacitance connected to a point between said resistor and said plate and to said cathode, the value of said capacitance being such that energy stored therein will maintain oscillations for a predetermined time and the value of said resistor in the plate supply circuit being such that the plate supply can not, by itself, maintain oscillations.

6. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent oscillations in the absence of signal in said input means, a capacitor having one side connected to said plate circuit and the other side connected to said cathode, the value of said capacitor being such that energy stored therein will maintain oscillations for a predetermined time, and supply means having its positive side connected to said one side of said capacitance and its negative side connected to said other side thereof to charge said capacitance, the rate of supply from said supply means being too slow to maintain oscillations by itself.

7. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent initiation of oscillation in the absence of signal in said input means, and means, operatively connected to said grid, whereon grid-cathode current builds up, at a fixed, substantially uniform rate, a sufficient negative potential to extinguish oscillations, and a power source supplying in toto the energy to maintain oscillations until extinguished.

8. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent initiation of oscillation in the absence of signal in said input means, and means including a capacitive element operatively connected to said tube to effect a change of potential on said element at a fixed predetermined rate during passage of current through said tube, the oscillations in said network ceasing when said element reaches a predetermined voltage and a power source supplying in toto the energy that maintains said oscillations.

9. Apparatus for radio reception, comprising input means; an oscillatory network including a vacuum tube having a cathode, a grid and a plate, a resonant grid circuit coupled to said input means and a resonant plate circuit coupled to said grid circuit, said grid circuit including also a resistor and a capacitor in parallel connected to said grid; an adjustable grid bias source connected to said grid to prevent oscillation in the absence of signal in said input means, plate supply means and a resistor in series therewith between said supply means and said plate, the other side of said supply means being connected to said cathode, and a capacitance connected to a point between said resistor and said plate and to said cathode, the value of said capacitance being such that energy stored therein will maintain oscillations for a predetermined time and the value of said resistor in the plate supply circuit being such that the plate supply can not, by itself, maintain oscillations.

10. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent oscillation in the absence of signal in said input means, plate supply means and a resistor in series therewith between said supply means and said plate, the other side of said supply means being connected to said cathode, and a capacitance connected to a point between said resistor and said plate and to said cathode, the value of said capacitance being such that energy stored therein will maintain oscillations for a predetermined time and the value of said resistor in the plate supply circuit being such that the plate supply can not, by itself, maintain oscillations.

11. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent oscillation in the absence of signal in said input means, plate supply means and a resistor in series therewith between said supply means and said plate, the other side of said supply means being connected to said cathode, and a capacitance having one side connected to said plate circuit and the other side connected to said cathode, the value of said capacitor being such that energy stored therein will maintain oscillations for a predetermined time, and supply means having its positive side connected to said one side of said capacitance and its negative side connected to said other side thereof to charge said capacitance, the rate of supply from said supply means being too slow to maintain oscillations by itself.

12. Apparatus for radio reception, comprising input means; an oscillatory network including a vacuum tube having a cathode, a grid and a plate, a resonant grid circuit coupled to said input means and a resonant plate circuit coupled to said grid circuit; means to bias said grid to prevent oscillation in the absence of signal in said input means, plate supply means and a resistor in series therewith between said supply means and said plate, the other side of said supply means being connected to said cathode, a capacitance having one side connected to said plate circuit and the other side connected to said cathode, the value of said capacitor being such that energy stored therein will maintain oscillations for a predetermined time, and supply means having its positive side connected to said one side of said capacitance and its negative side connected to said other side thereof to charge said capacitance, the rate of supply from said supply means being too slow to maintain oscillations by itself.

13. A radio signal receiver, comprising means responsive to each signal pulse in a series of pulses, means operatively connected to said responsive means to be set in operation by each such pulse to transfer energy, and means utilizing at least a portion of said transferred energy to stop the transfer of energy after an interval long in comparison with said pulse but before the arrival of the next succeeding pulse.

14. A radio signal receiver, comprising means responsive to each signal pulse in a series of pulses, means operatively connected to said responsive means to be set in operation by each such pulse to transfer energy, and means across which at least a portion of the energy transferred as aforesaid develops a potential effective to stop the transfer of energy after an interval long in comparison with said pulse but before arrival of the next succeeding pulse.

15. A radio receiver for time modulated pulse reception, comprising a receiving amplifying means for amplifying a succession of received pulses of a given radio frequency, a circuit for detecting said amplified radio frequency pulses and shaping the resultant detected pulses, said circuit comprising an input circuit tuned to said radio frequency for developing a predetermined voltage, a trigger circuit normally in unoperated condition and operative into operated condition in response to said predetermined voltage, means for coupling said tuned circuit to said trigger circuit, and time constant means for maintaining said trigger circuit operated for a substantially constant period of time at least as great as the duration time of said amplified pulses, means coupled to the output of said circuit for deriving a direct current pulse in response to each operation of said shaping circuit, and means for deriving the time modulation envelope of said received pulses from said direct current pulses.

16. A radio receiver according to claim 15 wherein said circuit further comprises means for determining operation of said trigger circuit to a predetermined amplitude, to control the amplitude level of said direct current pulses to substantially a constant value independent of said applied pulses.

17. A circuit for detecting radio frequency input pulses and producing therefrom output pulses having substantially the same timed relation to one another as the input pulses and amplitudes and duration periods independent of those of the input pulses, comprising an impulse trigger circuit having an input circuit and an output circuit, means normally maintaining said trigger circuit in unoperated condition, means responsive to a predetermined input voltage for rendering said trigger circuit operative, duration control means for maintaining said trigger circuit operative for a predetermined interval after application of said predetermined voltage, means in said input circuit resonant to said radio frequency for receiving said radio frequency pulses and developing said predetermined voltage in response to each said received pulses to cause operation of said trigger circuit, and means in the output circuit of said trigger circuit for deriving pulses of predetermined amplitude and duration in response to operation of said trigger circuit.

ARTHUR A. VARELA.

REFERENCES CITED

The following references are of record in the file of this patent:

UNITED STATES PATENTS

| Number | Name | Date |
|---|---|---|
| 1,243,789 | Wright | Oct. 23, 1917 |
| 1,455,767 | Slepian | May 15, 1923 |
| 1,455,768 | Slepian | May 15, 1923 |
| 1,489,158 | Schaffer | Apr. 1, 1924 |
| 1,902,234 | Heintz | Mar. 21, 1933 |
| 2,010,253 | Barton | Aug. 6, 1935 |